United States Patent
Messerges

(10) Patent No.: US 9,450,947 B2
(45) Date of Patent: Sep. 20, 2016

(54) APPARATUS AND METHOD FOR SECURING A DEBUGGING SESSION

(71) Applicant: MOTOROLA SOLUTIONS, INC, Schaumburg, IL (US)

(72) Inventor: Thomas S. Messerges, Schaumburg, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 163 days.

(21) Appl. No.: 14/282,043

(22) Filed: May 20, 2014

(65) Prior Publication Data

US 2015/0341341 A1 Nov. 26, 2015

(51) Int. Cl.
*H04L 29/06* (2006.01)
*H04L 9/32* (2006.01)
*G06F 11/36* (2006.01)
*G06F 21/30* (2013.01)
*G06F 21/33* (2013.01)

(52) U.S. Cl.
CPC ............. *H04L 63/0823* (2013.01); *H04L 9/32* (2013.01); *H04L 9/3268* (2013.01); *G06F 11/36* (2013.01); *G06F 11/3656* (2013.01); *G06F 21/30* (2013.01); *G06F 21/33* (2013.01); *H04L 9/3263* (2013.01); *H04L 9/3294* (2013.01); *H04L 63/166* (2013.01)

(58) Field of Classification Search
CPC .... G06F 21/30; G06F 21/33; G06F 11/3656; G06F 11/36; H04L 9/006; H04L 9/3263; H04L 9/3294; H04L 63/0823; H04L 9/3268; H04L 63/166

USPC ................ 713/168, 155, 156, 169, 173, 175
See application file for complete search history.

(56) References Cited

U.S. PATENT DOCUMENTS

| | | |
|---|---|---|
| 6,636,975 B1 | 10/2003 | Khidekel et al. |
| 8,001,371 B2 * | 8/2011 | Langer .......................... 713/156 |
| 8,122,244 B2 | 2/2012 | Azema et al. |
| 8,312,262 B2 | 11/2012 | Mauro et al. |
| 8,332,641 B2 | 12/2012 | Case et al. |
| 8,438,621 B2 | 5/2013 | Zhang et al. |
| 8,452,954 B2 | 5/2013 | Strong et al. |
| 8,522,361 B2 | 8/2013 | Kline et al. |
| 8,627,422 B2 * | 1/2014 | Hawkes et al. .................... 726/5 |
| 2002/0078380 A1 | 6/2002 | Lin et al. |
| 2005/0207415 A1 * | 9/2005 | Curcio et al. ................. 370/390 |
| 2006/0048228 A1 * | 3/2006 | Takemori et al. .............. 726/22 |
| 2009/0119513 A1 * | 5/2009 | Chung .......................... 713/187 |
| 2011/0066835 A1 | 3/2011 | Kothari et al. |
| 2011/0154043 A1 * | 6/2011 | Lim et al. ...................... 713/172 |
| 2013/0212382 A1 | 8/2013 | Etchegoyen et al. |
| 2015/0270975 A1 * | 9/2015 | Buckley et al. .............. 713/171 |

* cited by examiner

*Primary Examiner* — Nirav B Patel

(57) ABSTRACT

A device executes debugging instructions received from a debugging computer. The device receives a debugging establishment request from the debugging computer. The device transmits a unique identifier associated with the device and a secured expiration value to the debugging computer. The device receives a transport layer security (TLS) certificate from the debugging computer and establishes a secured and authenticated link with the debugging computer using the TLS certificate. The device enables a debugging mode, responsive to determining that an identifier in the TLS certificate matches the unique identifier and that a secured expiration value in the TLS certificate is valid and within a predefined validity range, and executes, in the debugging mode, debugging instructions received from the debugging computer.

18 Claims, 4 Drawing Sheets

APPARATUS AND METHOD FOR SECURING A DEBUGGING SESSION

BACKGROUND OF THE INVENTION

After an electronic device, such as a mobile radio, has been deployed outside of a development phase (for example, after the electronic device is deployed to customers for use), operational problems may occur that may need to be debugged. It is critical, however, that debugging operations be restricted to prevent, for example, unauthorized extraction of sensitive information from the device or unauthorized modifications to the device's operation and settings. A current debugging tool allows a user to telnet to a device (i.e., log into the device using a telnet program) to extract information from the device. The extracted information may then be used in debugging operations and to control certain functions in the device. Typically, "released" devices (i.e., devices that are released to customers and that are no longer in the development phase) are shipped with a limited set of debugging capabilities, whereas, "development" devices (i.e., devices used within a controlled development environment) may be updated/flashed, as needed, with a more comprehensive set of debug capabilities.

In some cases, the limited set of debugging capabilities on a released device may not be adequate. However, it may be impossible to recall the released device and put it in a controlled development environment for debugging with the comprehensive set of debug capabilities. In these cases, it may be necessary to update the released device with the comprehensive set of debug capabilities in the field (i.e., outside of the development environment). However, once a released device outside of a controlled development environment is updated with the comprehensive set of debug capabilities, it may difficult to restrict access to the comprehensive debug capabilities on the released device, and thereby prevent unauthorized access to the comprehensive debug capabilities on the released device.

A flashing tool is typically used to update the operational software on a device. It is also critical that access to the flashing tool be restricted to prevent devices from being updated with unauthorized software. If in the case where it becomes necessary to update the released device with the comprehensive set of debug capabilities in the field, the flashing tool must be also released to perform the updates. Before the flashing tool can update software in secured memory locations on a device, the flashing tool must authenticate itself to the device (i.e., to unlock the device). During the authentication process, the device is configured to query the flashing tool for a secret. In a current method, the device may authenticate the flashing tool if the flashing tool can provide a global shared secret and a secret algorithm. Only a flashing tool with knowledge of these two global secrets may update operational software on a device. Unfortunately, similar to the comprehensive set of debug capabilities, once the flashing tool is released, it may also be difficult to secure the global secrets within the flashing tool. For example, once the flashing tool is released, the global secret may be accessed via an unauthorized reversed engineering process.

One avenue for enabling debugging operations on a device may be to load a lab certificate (a signed digital certificate) into the device and to have the device verify that the lab certificate is loaded on the device at boot time. A lab certificate is typically bound to a particular device such that the lab certificate will only be deemed valid on a device if, at boot time, a bootloader on the device determines that a device identifier in the lab certificate matches a unique identifier in the device. Accordingly, before the lab certificate can used to enable debugging operations and turn on a debugging mode on the device, the lab certificate including the device's unique ID must be created, digitally signed, flashed into the device, and verified by the device at boot time. This approach allows the lab certificate to enable debugging operations on a single released device and cannot be exploited to allow unauthorized debugging operations on other released devices.

After the device is switched to debugging mode, the device may communicate with a remote debugging tool during a debugging session. For example, during the debugging session, the remote debugging tool may communicate with the device to download its memory, put the device into a special mode, and/or retrieve log files from the device. However, if the device with the lab certificate is lost or accidentally released before the comprehensive set of debug capabilities are uninstalled and/or before the lab certificate is removed, anyone with authorized or unauthorized access to the device may be able to perform debugging operations on the device. Also, releasing a tool with the capability to write a lab certificate to the flash memory of a device outside of a development environment is undesirable. As previously mentioned, once the flashing tool is released, it may also be difficult to secure the global authentication secrets within the flashing tool. For example, once the flashing tool is released, the global secret may be accessed via an unauthorized reversed engineering process.

Furthermore, when the lab certificate is employed to enable debugging capabilities, application level instructions for enabling the debugging capabilities are typically carried out by low-level bootloader software that authenticates the lab certificate. The size of the bootloader software is typically severely constrained by hardware requirements and the bootloader software rarely, if ever, gets updated. Therefore, it will be problematic to add application debug-support features to the lab certificate, and more particularly, to update or change debug-support features if those features are to be executed by the bootloader software.

Accordingly, there is a need for a method and apparatus for securing a debugging session.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
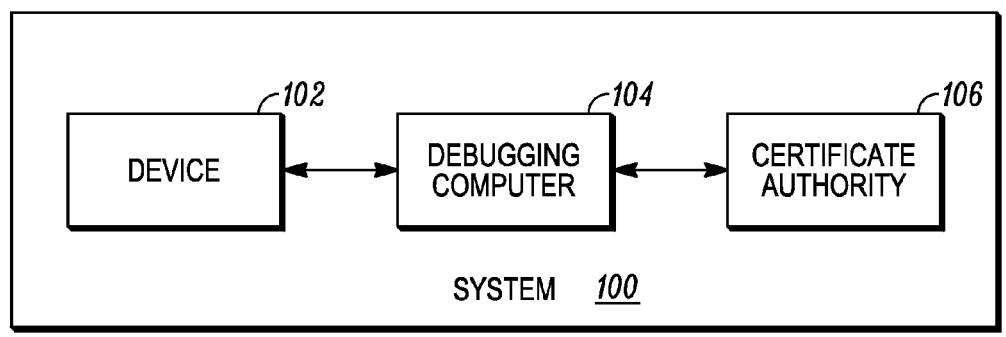
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods for executing, on a device, debugging instructions received from a debugging computer. The device receives a debugging establishment request from the debugging computer. The device transmits a unique identifier associated with the device and a secured expiration value to the debugging computer. The device receives a transport layer security (TLS) certificate from the debugging computer and establishes a secured and authenticated link with the debugging computer using the TLS certificate. The device enables a debugging mode, responsive to determining that an identifier in the TLS certificate matches the unique identifier and that a secured TLS expiration value in the TLS certificate is valid and within a predefined validity range, and executes, in the debugging mode, debugging instructions received from the debugging computer.

FIG. 1 is a block diagram of a system used in accordance with some embodiments. System 100 includes a device 102, a debugging computer 104, and a certificate authority 106. Device 102 may be, for example, a mobile communications device such as a radio whose operations may be debugged based on instructions received from debugging computer 104. Debugging computer 104 may be, for example, a computer communicatively coupled to device 102 and configured to send debugging instructions to device 102 during a debugging session. For example, during the debugging session, debugging computer 104 may send instructions to device 102 to download information from specific memory portions on device 102, put device 102 into a special mode, and/or retrieve other information from device 102. Debugging computer 104 may be connected to device 102 via a wired or wireless connection. Debugging computer 104 may also be communicatively coupled, via wired or wireless connection, to certificate authority 106. Certificate authority 106 may be, for example, a server or another computer that is configured to provide digital certificates to debugging computer 104.

In order to perform debugging operations on device 102, subsequent to connecting with device 102, debugging computer 104 may send a debugging establishment request to device 102. The debugging establishment request may be a request for a unique identifier associated with device 102 and an expiration value. At a subsequent time when a debugging session is established between device 102 and debugging computer 104, device 102 may use the expiration value to determine when it should stop executing debugging instructions received from debugging computer. Therefore, the expiration value may be a value that device 102 can monitor over a time period and/or a value that may be based on execution of certain operations. Subsequent to receiving the debugging establishment request, device 102 may obtain a unique identifier associated with device 102 and may determine the expiration value.

Prior to transmitting the expiration value in response to the debugging establishment request, device 102 may secure the expiration value with a cryptographic mechanism that makes use of one or more of a cryptographic hash algorithm, a digital signature, or an encryption algorithm. For example, the integrity and authenticity of the expiration value may be ensured by having device 102 create a message authentication code (MAC) over the expiration value with a unique key known only to device 102, thereby preventing debugging computer 104 or another device from tampering with the expiration value without such tampering being detected by device 102. By ensuring the integrity and authenticity of the expiration value, device 102 may prevent debugging computer 104 or another device from extending a time period, as provided by the expiration value, for a debugging session. Subsequent to securing the expiration value, device 102 may transmit the unique identifier associated and the secured expiration value to debugging computer 104.

Subsequent to receiving the unique identifier and the secured expiration value from device 102, debugging computer 104 may send a certificate request to certificate authority 106. Protocols such as the Simple Certificate Enrollment Protocol (SCEP), the Certificate Management over CMS protocols (RFC 5272), and the Certificate Management Protocol (RFC 4210) define ways to request a new certificate. In addition to, or as part of, the fields and information found in a typical certificate request, the certificate request employed by system 100 may include the unique identifier associated with device 102 and the secured expiration value received from device 102. Responsive to receiving the certificate request from debugging computer 104, certificate authority 106 may create and sign a transport layer security (TLS) certificate. The TLS certificate (also referred to herein as a "bound" authentication certificate) may be, for example, an X.509 certificate, used in a typical TLS session according to current TLS protocols. During creation of the TLS certificate, certificate authority 106 may sign the TLS certificate with a key for debugging computer 104 that is linked to a key rooted by a trust anchor of device 102. The signed TLS certificate may include the unique identifier associated with device 102 and the secured expiration value generated by device 102, in addition to, or as part of, the typical fields and information found in a standard TLS certificate. For example, the TLS certificate might include the unique identifier associated with device 102 as part of a certificate subject field and the secured expiration value as part of one of the validity fields in the TLS certificate. After certificate authority 106 generates the TLS certificate, certificate authority 106 transmits the signed TLS certificate to debugging computer 104.

Responsive to receiving the signed TLS certificate, debugging computer 104 may attempt to establish a secured and authenticated TLS session with device 102. Using a current TLS protocol, during the TLS session establishment, debugging computer 104 may forward the TLS certificate to device 102 and the parties may use the TLS certificate and asymmetric cryptography to ensure that they are communicating with each other. During the TLS session establishment, device 102 and debugging computer 104 may also establish a TLS session key that may be used to encrypt data to be exchanged by the parties. As part of a typical TLS verification process, device 102 may ensure that the signed TLS certificate has a valid signature and device 102 may use the signature to authenticate debugging computer 104.

In some embodiments, to enable a debugging mode on device 102, subsequent to establishing a session with debugging computer 104, device 102 may ensure that an identifier in the signed TLS certificate matches its own identifier and may determine that the TLS certificate is not expired by, for example, ensuring that a secured expiration value in the TLS certification (also referred to herein as a secured TLS expiration value) is valid and within a specified validity range. After the TLS session is established between device 102 and debugging computer 104, if the identifier in the signed TLS certificate matches the device identifier and if the secured TLS expiration value is valid and within a specified validity range, device 102 may execute debugging instructions received over the TLS session from debugging computer 104. If the TLS session establishment or one of these additional checks fails (i.e., if the identifier in the signed TLS certificate does not match the device identifier and/or if the secured TLS expiration value in the signed TLS certificate is not valid or within a specified validity range), device 102 may ignore debugging commands sent by debugging computer 104 and the TLS session may be shut down.

Device 102 may determine if the secured TLS expiration value is valid by performing a cryptographic check based on how the expiration value in the TLS certificate was originally secured by device 102. For example, if device 102 used a cryptographic MAC with a secret key to originally secure the expiration value, then device 102 can calculate the cryptographic MAC using the same key and the expiration value. If this newly calculated MAC matches the MAC value found in the TLS certificate, then device 102 will know that the secured TLS expiration value is valid. Likewise, if device 102 used a digital signature to originally secure the expiration value, then device 102 can verify the digital signature of the secured TLS expiration value to determine if the secured TLS expiration value is valid. Similarly, if device 102 used an encryption algorithm to originally secure the expiration value, then device 102 can verify the secured TLS expiration value using a corresponding decryption algorithm.

In some embodiments, the secured TLS expiration value may be, for example, a timestamp or a counter value, such as a Hobbs meter value, which is secured using one of the previously mentioned techniques, such as a MAC, a digital signature or encryption operation. Device 102 may ensure that the secured TLS expiration value is within a specified validity range by, for example, comparing timestamp value represented in the secured TLS expiration value in the TLS certification to a current time/counter value (referred to herein as a current timestamp) stored in device 102. To prevent debugging computer 104 or another device from rolling back the current timestamp stored in device 102, the current timestamp may be maintained in a memory location that is not easily accessed or modified by an entity outside of device 102. For further protection, the current timestamp can be stored in a secure element, such as an advanced crypto engine integrated chip, or maintained by a trusted execution environment (TEE). In addition, the calculation of the MAC of the secured expiration value, provided by device 102 in response to the debugging establishment request, can also be off-loaded to the secure element or TEE to ensure the authenticity and integrity of the expiration value.

Consider an example where the secured TLS expiration value in the TLS certification is a counter value. Subsequent to ensuring upon initial receipt of the TLS certificate that the TLS certificate is not expired, device 102 may ensure that the secured TLS expiration value is less than or greater than its current timestamp before enabling a debugging mode on device 102. In some embodiments, after the debugging mode is enabled, device 102 may increment or decrement its current timestamp value each time a predefined operation occurs. For example, device 102 may increment or decrement the current timestamp value each time device 102 is powered on or each time a button on device 102 is activated. In the case where after each reset operation device 102 increases the current timestamp value, device 102 may verify that the secured TLS expiration value remains within the specified validity range by ensuring that the current timestamp value remains below the secured TLS expiration value in the TLS certification. Once the current timestamp value exceeds the secured TLS expiration value, device 102 may not execute debugging instructions received from debugging computer 104. Similarly in the case where after each reset operation device 102 decreases the current timestamp value, device 102 may verify that the secured TLS expiration value remains within the specified validity range by ensuring that the current timestamp value remains above the secured TLS expiration value. Once the current timestamp value falls below the secured TLS expiration value, device 102 may not execute debugging instructions received from debugging computer 104. Once a TLS certificate is expired, debugging computer 104 would need to acquire a new TLS certificate with an updated timestamp value to continue debugging.

Consider an example where device 102 determines that its current timestamp value is 7 when device 102 receives a debugging establishment request from debugging computer 104. Subsequent to receiving the debugging establishment request, device 102 may determine that an expiration value is 11. Subsequent to determining the expiration value, device 102 may secure the expiration value (i.e., 11) and transmit the secured expiration value to debugging computer 104 in a response to the debugging establishment request. Debugging computer 104 transmits the secured expiration value in a certificate request to certificate authority 106 and certificate authority 106 includes the secured expiration value (i.e., 11 and any other information used to secure this value, such as a MAC or digital signature) in a TLS certificate sent in response to the certificate request. At a subsequent time when a debugging session is established between device 102 and debugging computer 104 using the TLS certificate, device 102 may increment its current timestamp (e.g., from 7 to 8) each time a predefined operation occurs, compare the current timestamp to the secured TLS expiration value (i.e., 11), and stop executing debugging instructions provided by debugging computer 104 when the current timestamp value is greater than the expiration value. In another embodiment, device 102 may decrement the timestamp instead of incrementing it. In such an embodiment, device 102 may execute debugging instructions in response to determining that the secured expiration value in the TLS certification is less than its current timestamp. That is, during a debugging session established based on the TLS certificate, device 102 may decrement its current timestamp each time a predefined operation occurs, compare the current timestamp to the secured TLS expiration value, and stop executing debugging instructions provided by debugging computer 104 when the current timestamp value is less than the expiration value.

In some embodiments, instead of or in addition to a determined expiration value, device 102 may send its current, secured timestamp in a response to the debugging establishment request. In these embodiments, during creation of the TLS certificate, certificate authority 106 may insert the secured timestamp transmitted by device 102 and an interval value in the TLS certificate. After the TLS session is established between device 102 and debugging computer 104, if the identifier in the signed TLS certificate matches the identifier associated with device 102 and if a timestamp in the signed TLS certificate is valid and is within a predefined validity range as determined by the current timestamp stored in device 102 and the interval value in the TLS certificate, device 102 may enable a debugging mode and may execute the debugging instructions received over the TLS session. While the debugging mode is enabled, each time device 102 performs a predefined operation, device 102 may increase/decrease its current timestamp value and verify that this current timestamp value of device 102, when compared to the secured timestamp value in the TLS certificate, is within the range of the interval value in the TLS certificate (for example, the absolute difference between the two timestamps continues to be below the interval value that certificate authority 106 inserted into the TLS certificate). Once the absolute difference between the device 102 timestamp value and the secured timestamp value in the TLS certificate is greater than the interval value in the TLS certificate, depending on the protocol being implemented, device 102 may disable the debugging mode and cease to execute debugging instructions received from debugging computer 104. Using a time interval in the TLS certificate enables the certificate authority 106 to flexibly determine the expiration policy for TLS certificates that it issues while retaining the ability of device 102 to secure the timestamp value.

Rather than just using the TLS certificate to enable or disable a debugging mode on device 102, a debug level may be specified in the TLS certificate. For example, certain debugging operations may be associated with a specific debug level. When the TLS certificate specifies a debug level, those debugging operations associated with the specified debug level may be executed when device 102 is in the debugging mode.

Embodiments, therefore, enable the establishment of a secured debug session between debugging computer 104 and device 102. Unlike past debugging implementations, debugging computer 104 does not include an easily exploitable shared secret and device 102 does not need to be flashed with a lab certificate prior to enabling debugging capabilities on device 102, thereby eliminating the possibility that the lab certificate may not be erased when debugging is completed. Device 102 can therefore be shipped with latent debug capabilities, which are cryptographically locked down. Device 102 may authenticate debugging computer 104 at the same time it enables debugging operations. An existing implementation of TLS on device 102 can be leveraged, so very little new code or certificate parsing steps needs to be written, other than verifying the identifier and the expiration value included in the TLS certificate.

Figure 2:
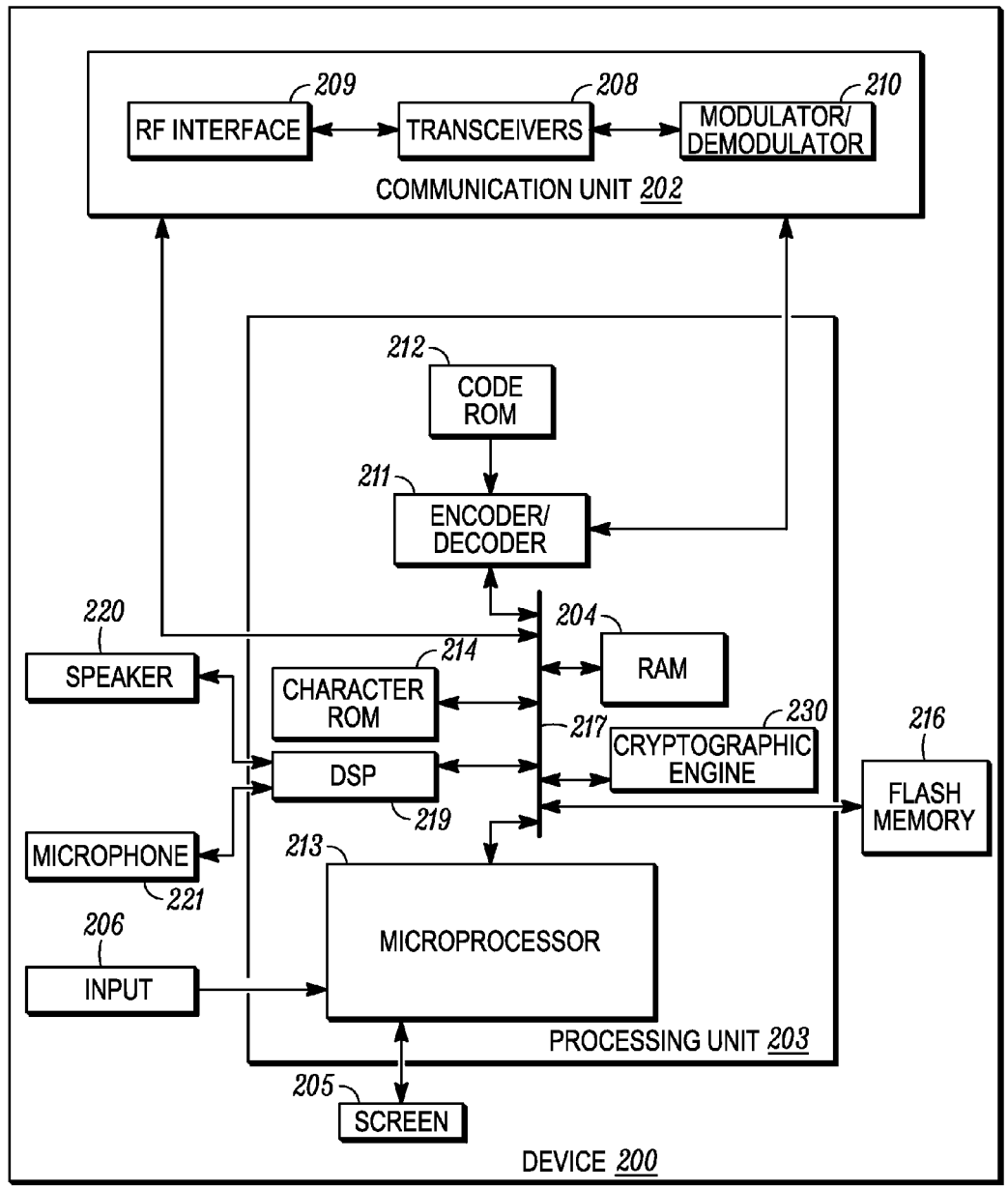
FIG. 2 is a block diagram of a remote device used in accordance with some embodiments.

FIG. 2 is a block diagram of a device 200, such as device 102, used in accordance with some embodiments. Device 200, for example, a radio includes a communications unit 202 coupled to a common data and address bus 217 of a processor 203 (also referred to as processing unit 203). Device 200 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processor 203.

The processor 203 may include, that is, implement, an encoder/decoder 211 with an associated code read-only memory (ROM) 212 for storing data for encoding and decoding voice, data, control, or other signals that may be transmitted or received by device 200. The processor 203 may further include one or more of a microprocessor 213 and digital signal processor (DSP) 219 coupled, by the common data and address bus 217, to the encoder/decoder 211 and to one or more memory devices, such as a character ROM 214, a random access memory (RAM) 204, and a flash memory 216. One or more of ROM 214, RAM 204 and flash memory 216 may be included as part of processor 203 or may be separate from, and coupled to, the processor and further may include a non-volatile memory portion for storing the timestamp and counter values of device 200. Further, the processor 203 includes, that is, implements, a cryptographic engine 230 for securing, for example, the expiration value and a secret key or other information used for securing the expiration. The encoder/decoder 211 and the cryptographic engine 230 may be implemented by microprocessor 213 or DSP 219, or may each be implemented by a separate component of the processor 203 and coupled to other components of the processor 203 via bus 217.

Communications unit 202 may include an RF interface 209 configurable to communicate with network components, and other user equipment within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 210 that is coupled to the encoder/decoder 211.

The one or more memory devices 212, 214, 216 maintain a unique identifier associated with the device 200, which unique identifier may be conveyed by the device to a debugging computer and then used by the device to authorize the execution of debugging instructions received from the debugging computer. The one or more memory devices 212, 214, 216 further store code for decoding or encoding data such as control, request, or instruction messages, channel change messages, and/or data or voice messages that may be transmitted or received by device 200 and other programs and instructions that, when executed by the processor 203, provide for the device 200 (for example, device 102) to perform the functions and operations described herein as being performed by such a device, such as the implementation of the encoder/decoder 211 and the cryptographic engine 230 as well as the steps set forth in FIGS. 3 and 4.

Figure 3:
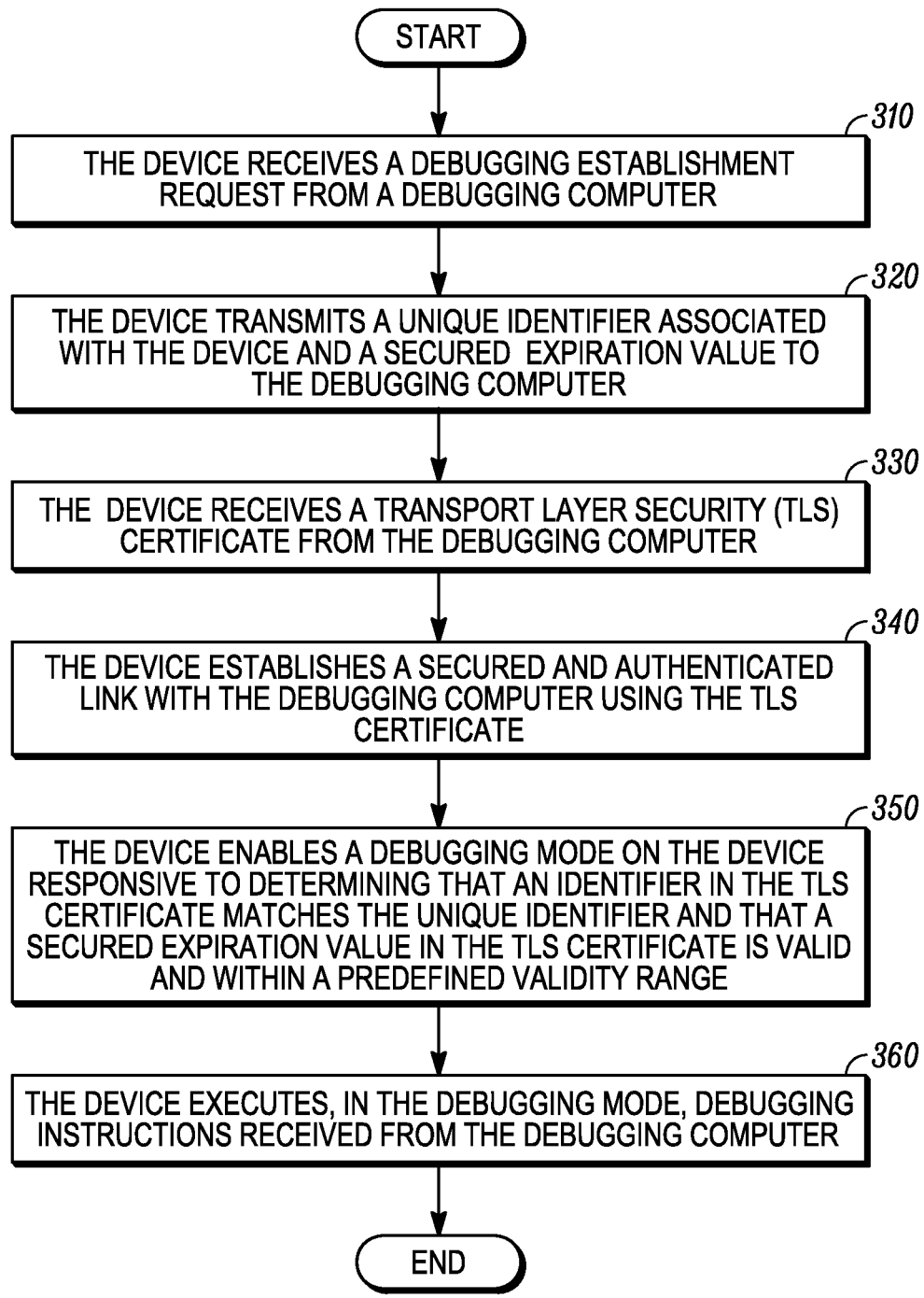
FIG. 3 illustrates a flow diagram for enabling a debugging mode on a device in accordance with some embodiments.

FIG. 3 illustrates a flow diagram for enabling a debugging mode on a device, such as device 102, in accordance with some embodiments. At 310, the device receives a debugging establishment request from a debugging computer, such as debugging computer 104. At 320, the device transmits a unique identifier associated with the device and a secured expiration value to the debugging computer. At 330, the device receives a transport layer security (TLS) certificate from the debugging computer. At 340, the device establishes a secured and authenticated link with the debugging computer using the TLS certificate. At 350, the device enables a debugging mode on the device responsive to determining that an identifier in the TLS certificate matches the unique identifier and that a secured expiration value in the TLS certificate is valid and has a timestamp value within a predefined validity range. At 360, the device executes, in the debugging mode, debugging instructions received from the debugging computer.

Figure 4:
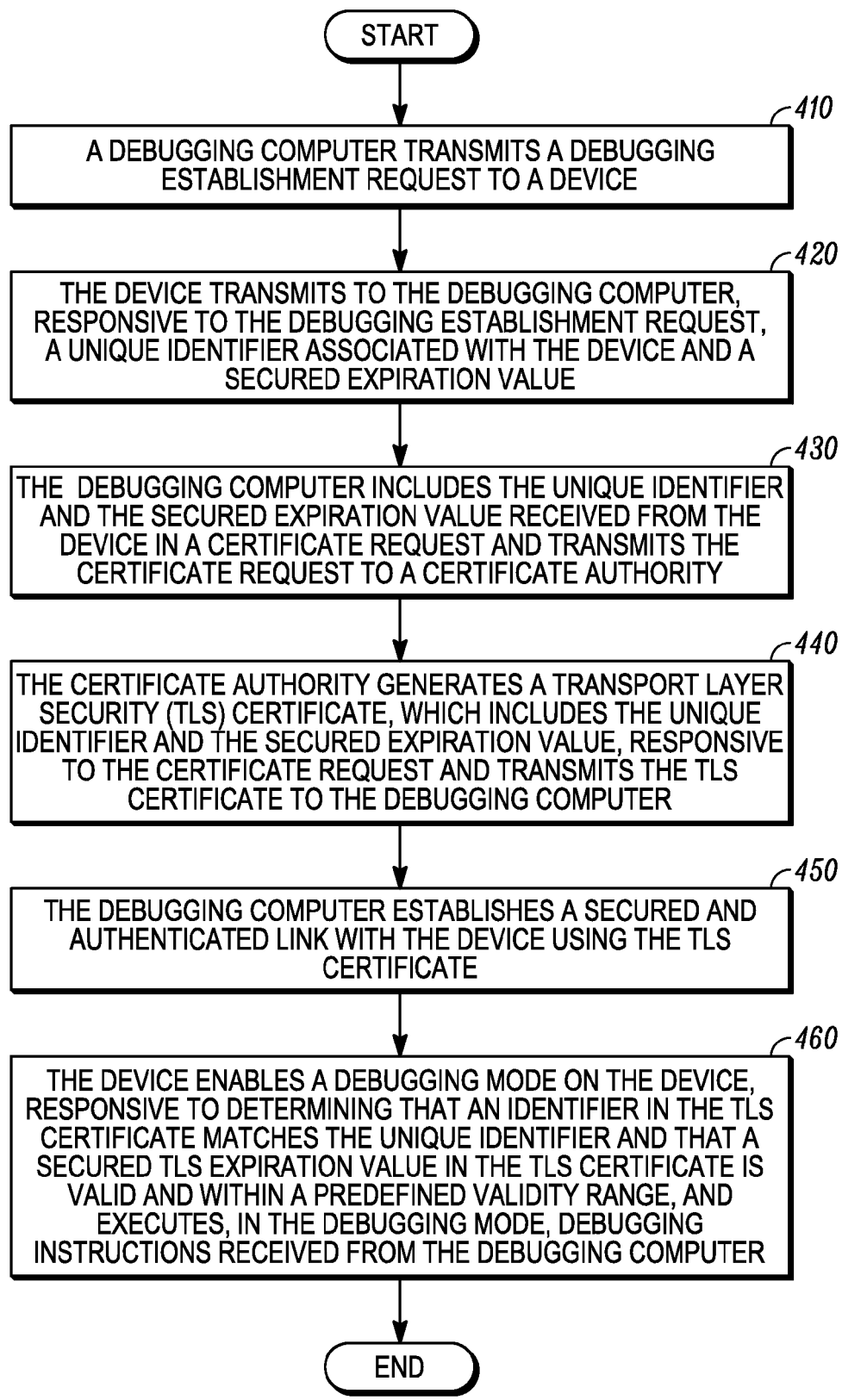
FIG. 4 illustrates a flow diagram for enabling a debugging mode on a device in a system in accordance with some embodiment.

FIG. 4 illustrates a flow diagram for enabling a debugging mode on a device, such as device 102, in a system in accordance with some embodiment. At 410, a debugging computer, such as debugging computer 104, transmits a debugging establishment request to a device. At 420, the device transmits to the debugging computer, responsive to the debugging establishment request, a unique identifier associated with the device and a secured expiration value. At 430, the debugging computer includes the unique identifier and the secured expiration value received from the device in a certificate request and transmits the certificate request to a certificate authority, such as certificate authority 106. At 440, the certificate authority generates a transport layer security (TLS) certificate, which includes the unique identifier and the secured expiration value, responsive to the certificate request and transmits the TLS certificate to the debugging computer. At 450, the debugging computer establishes a secured and authenticated link with the device using the TLS certificate. At 460, responsive to the device determining that an identifier in the TLS certificate matches the unique identifier and that a secured TLS expiration value in the TLS certificate is valid and within a predefined validity range, the device enables a debugging mode on the device and executes, in the debugging mode, debugging instructions received from the debugging computer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method, comprising:
   receiving, by a device, a debugging establishment request from a debugging computer;
   securing, by the device with a cryptographic mechanism, an expiration value to generate a secured expiration value;
   transmitting, by the device, a unique identifier associated with the device and the secured expiration value to the debugging computer;

receiving, by the device from the debugging computer, a transfer layer security (TLS) certificate, the TLS certificate including a second unique identifier based on the unique identifier and a secured TLS expiration value based on the secured expiration value;

establishing, by the device, a secured and authenticated link with the debugging computer using the TLS certificate;

enabling, by the device, a debugging mode on the device responsive to:
  determining that the second unique identifier matches the unique identifier,
  determining, with the cryptographic mechanism, that the secured TLS expiration value is valid, and
  determining that the secured TLS expiration value is within a predefined validity range; and executing, by the device in the debugging mode, debugging instructions received from the debugging computer.

2. The method of claim 1, wherein the TLS certificate is configured to specify a debug operation level on the device.

3. The method of claim 1, wherein the secured TLS expiration value is a secured counter value and the enabling comprises enabling the debugging mode on the device responsive to determining that the identifier in the TLS certificate matches the unique identifier and determining that the TLS certificate is not expired by verifying the validity of the secured counter value and comparing the secured counter value in the TLS certificate to a counter value determined by the device.

4. The method of claim 3, further comprising one of:
increasing the counter value determined by the device responsive to performing a predefined operation, verifying that the secured counter value in the TLS certificate is greater than the counter value determined by the device and maintaining the debugging mode subsequent to verifying that the secured counter value in the TLS certificate is greater than the counter value determined by the device; and decreasing the counter value determined by the device responsive to performing a predefined operation, verifying that the secured counter value in the TLS certificate is less than the counter value determined by the device and maintaining the debugging mode subsequent to verifying that the secured counter value in the TLS certificate is less than the counter value determined by the device.

5. The method of claim 1, wherein the secured expiration value is a current timestamp value of the device and wherein the secured TLS expiration value includes a secured TLS timestamp value and an interval value,
wherein enabling the debugging mode on the device comprises enabling the debugging mode responsive to determining that the identifier in the TLS certificate matches the unique identifier and that the secured TLS timestamp in the TLS certificate is valid and is within the predefined validity range as determined by the current timestamp value of the device and the interval value in the TLS certificate, and wherein the executing debugging instructions comprises one of increasing or decreasing the current timestamp value of the device in response to performing a predefined operation and verifying that the current timestamp value of the device as compared to the secured TLS timestamp value is within the range of the interval value in the TLS certificate.

6. The method of claim 1, wherein the establishing comprises authenticating the TLS certificate using a key associated with the debugging host and rooted by a trust anchor of the device.

7. A device, comprising:
a memory;
a transceiver configured to receive a debugging establishment request from a debugging computer; and
a processor configured to:
  obtain a unique identifier associated with the device and an expiration value;
  secure, with a cryptographic mechanism, an expiration value to generate a secured expiration value;
  transmit, via the transceiver, the unique identifier associated with the device and the secured expiration value to the debugging computer;
  receive, via the transceiver, a transfer layer security (TLS) certificate, the TLS certificate including a second unique identifier based on the unique identifier and a secured TLS expiration value based on the secured expiration value, sent from the debugging computer;
  establish a secured and authenticated link with the debugging computer using the TLS certificate;
  enable a debugging mode on the device responsive to:
    determining that the second unique identifier matches the unique identifier,
    determining, with the cryptographic mechanism, that the secured TLS expiration value is valid, and
    determining that the secured TLS expiration value is within a predefined validity range; and
  execute, in the debugging mode, debugging instructions received from the debugging computer.

8. The device of claim 7, wherein the TLS certificate is configured to specify a debug operation level on the device.

9. The device of claim 7, wherein the secured TLS expiration value is a secured counter value and the processor is configured to enable the debugging mode responsive to determining that the identifier in the TLS certificate matches the unique identifier and determining that the TLS certificate is not expired by verifying the validity of the secured counter value and by comparing the secured counter value in the TLS certificate to a counter value determined by the device.

10. The device of claim 9, wherein the processor is configured to one of:
increase the counter value determined by the device responsive to performing a predefined operation, verify that the secured counter value in the TLS certificate is greater than the counter value determined by the device, and maintain the debugging mode subsequent to verifying that the secured counter value in the TLS certificate is greater than the counter value determined by the device; and decrease the counter value determined by the device responsive to performing a predefined operation, verify that the secured counter value in the TLS certificate is less than the counter value determined by the device, and maintain the debugging mode subsequent to verifying that the secured counter value in the TLS certificate is less than the counter value determined by the device.

11. The device of claim 7, wherein the secured expiration value is a current timestamp value of the device and wherein the secured TLS expiration value includes a secured TLS timestamp value and an interval value,
wherein the processor is configured to enable the debugging mode responsive to determining that the identifier in the TLS certificate matches the unique identifier and that the secured TLS timestamp value in the TLS certificate is valid and is within the predefined validity range as determined by the current timestamp value of the device and the interval value in the TLS certificate, and wherein the processor is configured to execute debugging instructions by one of increasing or decreasing the current timestamp value of the device in response to performing a predefined operation and verifying that the current timestamp value of the device as compared to the secured TLS timestamp is within the range of the interval value in the TLS certificate.

12. The device of claim 7, wherein in establishing the secured and authenticated link wherein the processor is configured to authenticate the TLS certificate using a key associated with the debugging host and rooted by a trust anchor of the device.

13. A system, comprising:
a debugging computer configured to transmit a debugging establishment request to a device;
the device configured to
generate, with a cryptographic mechanism, a secured expiration value, and
transmit, to the debugging computer, a unique identifier associated with the device and the secured expiration value responsive to the debugging establishment request; and
a certificate authority configured to receive a certificate request from the debugging computer, to generate a transfer layer security (TLS) certificate, which includes a second unique identifier based on the unique identifier and a secured TLS expiration value based on the secured expiration value, responsive to receiving the certificate request, and to transmit the TLS certificate to the debugging computer,
wherein the debugging computer is configured to establish a secured and authenticated link with the device using the TLS certificate, and
wherein the device is configured to enable a debugging mode on the device, responsive to:
determining that the second unique identifier matches the unique identifier,
determining, with the cryptographic function, that the secured TLS expiration value is valid, and
determining that the secured TLS expiration value is within a predefined validity range, and
execute, in the debugging mode, debugging instructions received from the debugging computer.

14. The system of claim 13, wherein the TLS certificate is configured to specify a debug operation level on the device.

15. The system of claim 13, wherein the secured TLS expiration value is a secured counter value and the device is configured to enable the debugging mode responsive to determining that the identifier in the TLS certificate matches the unique identifier and determining that the TLS certificate is not expired by verifying the validity of the secured counter value and by comparing the secured counter value in the TLS certificate to a counter value determined by the device.

16. The system of claim 15, wherein the device is further configured to one of:
increase the counter value determined by the device responsive to performing a predefined operation, verify that the secured counter value in the TLS certificate is greater than the counter value determined by the device, and maintain the debugging mode subsequent to verifying that the secured counter value in the TLS certificate is greater than the counter value determined by the device; and
decrease the counter value determined by the device responsive to performing a predefined operation, verify that the secured counter value in the TLS certificate is less than the counter value determined by the device, and maintain the debugging mode subsequent to verifying that the secured counter value in the TLS certificate is less than the counter value determined by the device.

17. The system of claim 13, wherein the secured expiration value is a secured current timestamp value of the device and wherein the secured TLS expiration value includes the secured current timestamp value and an interval value provided by the certificate authority,
wherein enabling the debugging mode on the device comprises enabling the debugging mode responsive to determining that the identifier in the TLS certificate matches the unique identifier and that the secured current timestamp value in the TLS certificate is valid and is within the predefined validity range as determined by the current timestamp value of the device and the interval value in the TLS certificate, and
wherein the executing debugging instructions comprises one of increasing or decreasing, by the device, the current timestamp value of the device in response to performing a predefined operation and verifying that the current timestamp value of the device as compared to the secured current timestamp value in the TLS certificate is within the range of the interval value in the TLS certificate.

18. The system of claim 17, wherein the verifying that the current timestamp value of the device as compared to the secured current timestamp value in the TLS certificate is within the range of the interval value in the TLS certificate comprises: verifying, by the device, that an absolute difference between the current timestamp value of the device and the secured current timestamp value in the TLS certificate is less than the interval value in the TLS certificate.

* * * * *